United States Patent
Mowry et al.

(10) Patent No.: US 9,260,046 B2
(45) Date of Patent: Feb. 16, 2016

(54) VEHICLE STOWABLE SHELVING UNIT

(71) Applicant: Wheeler Brothers, Inc., Somerset, PA (US)

(72) Inventors: Christopher Mowry, Somerset, PA (US); Charles E. Dillion, II, Somerset, PA (US); Jonathon Kimmel, Somerset, PA (US); Jason McClemens, Somerset, PA (US); Chad Burnosky, Somerset, PA (US); Scott Brant, Somerset, PA (US); Jeffrey Reeping, Somerset, PA (US)

(73) Assignee: WHEELER BROS., INC.—A SUBSIDIARY OF VSE CORPORATION, Somerset, PA (US)

( * ) Notice: Subject to any disclaimer, the term of this patent is extended or adjusted under 35 U.S.C. 154(b) by 0 days.

(21) Appl. No.: 14/141,152

(22) Filed: Dec. 26, 2013

(65) Prior Publication Data
US 2015/0183360 A1    Jul. 2, 2015

(51) Int. Cl.
*A47B 3/00* (2006.01)
*B60P 3/00* (2006.01)
*A47B 46/00* (2006.01)
*A47B 96/02* (2006.01)
*A47B 96/06* (2006.01)
*A47B 5/04* (2006.01)

(52) U.S. Cl.
CPC .............. *B60P 3/007* (2013.01); *A47B 46/005* (2013.01); *A47B 96/028* (2013.01); *A47B 96/067* (2013.01); *A47B 5/04* (2013.01)

(58) Field of Classification Search
CPC ...... A47B 23/001; A47B 96/061; A47B 5/04; A47B 57/42; A47B 57/56; A47B 57/045; A47F 5/101
USPC ............. 108/108, 134, 152, 42, 47, 48; 248/240.4, 241, 242
See application file for complete search history.

(56) References Cited

U.S. PATENT DOCUMENTS

| | | | | |
|---|---|---|---|---|
| 1,200,477 A | * | 10/1916 | Frantz | 108/134 |
| 1,777,886 A | * | 10/1930 | Kusterle | 248/292.14 |
| 2,210,762 A | * | 8/1940 | Itzigson | 16/235 |
| 2,693,400 A | * | 11/1954 | Erickson | 108/134 |
| 3,485,382 A | * | 12/1969 | Larson | 108/107 |
| 3,795,379 A | * | 3/1974 | Gray | 248/242 |
| 3,977,334 A | * | 8/1976 | Carroll | 108/134 |
| 4,717,104 A | * | 1/1988 | Lee | 248/241 |
| D294,221 S | * | 2/1988 | Sheftel | 248/242 |
| 4,934,645 A | * | 6/1990 | Breslow | 248/242 |
| D313,743 S | * | 1/1991 | Mastrodicasa | D8/381 |
| 5,775,655 A | * | 7/1998 | Schmeets | 108/42 |
| 2003/0106475 A1 | * | 6/2003 | Chen | 108/134 |

* cited by examiner

*Primary Examiner* — Jose V Chen
(74) *Attorney, Agent, or Firm* — Arent Fox LLP

(57) ABSTRACT

A shelving unit including three wall clip/brackets and a shelf pivotally attached to the clip/brackets. Each clip/bracket includes a mounting engagement portion and a pair of parallel, extending arms. Each arm has a curved slot, and a pivot hole positioned above one end of the slot. The arc of the slot sets the other end of the slot higher. The shelf is pivotally bolted to the clip/bracket. A pin pivotally passes through the curved slots of the pair of arms and engages the shelf. One of the three clip/brackets has an additional vertical retention slot at the lower end of the curved slot. The shelf is pivotable to a first, substantially horizontal position with the pins at the other end of the slots, and to a second, substantially vertical position with the pin of the one of the three brackets being in the vertical retention slot of the one bracket.

4 Claims, 7 Drawing Sheets

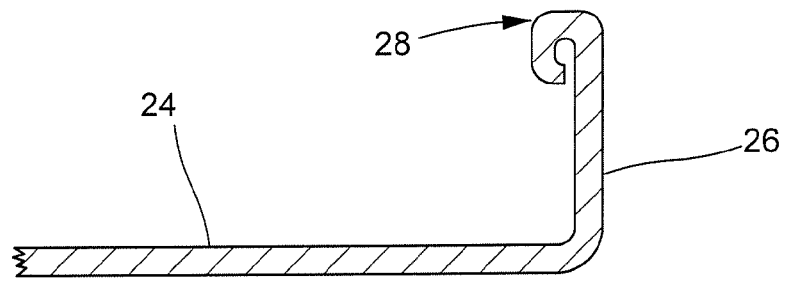
FIG.9
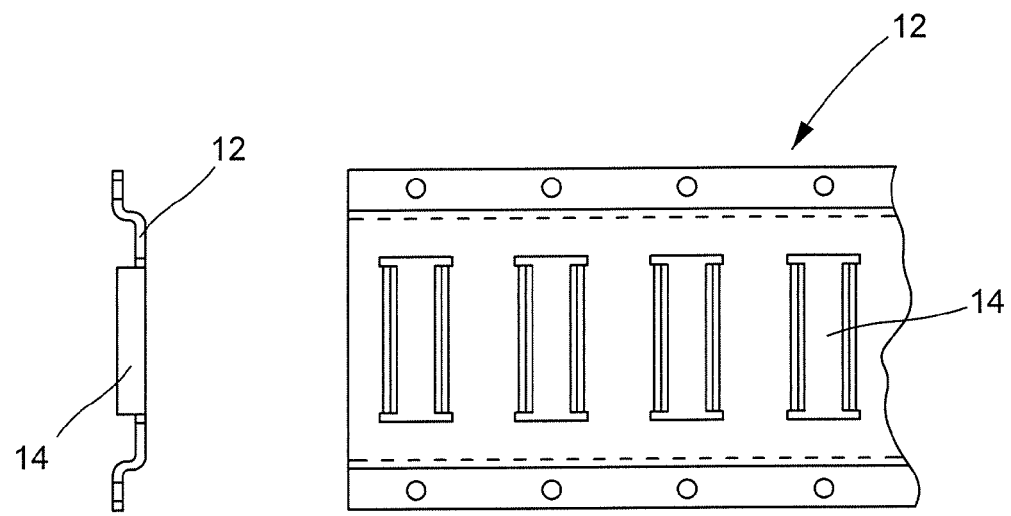
FIG.10A
Prior Art
FIG.10B
Prior Art

VEHICLE STOWABLE SHELVING UNIT

The present invention relates to a shelving unit for use inside of a vehicle such as a panel truck wherein the shelf can be raised and stowed in the vertical position in a simple, safe, and easy manner. Further, the shelf can be easily returned to the horizontal position.

BACKGROUND OF THE INVENTION

Various delivery companies/services maintain a fleet of delivery vehicles with internal shelving to hold packages and other items for delivery. The user needs to be able to quickly and easily add items to and remove items from the shelf from the rear opening of the vehicle. Similarly, when the shelf is empty, the user needs to be able to quickly and easily stow the empty shelf in a position that is out of the way. Restoration of the shelf from the stowed position also needs to be simple and easy for the user preferably from the rear opening of the vehicle.

Any shelving unit must also meet "customer requirements" of low cost, safety, ease of installation and replacement, and minimal added weight. Delivery companies/services maintain large fleets of vehicles and any shelving solution should not be complex to minimize cost during retrofitting or replacement of current structures. Any installation of the shelving unit should be easy and quick to perform. Safety of the user during use is paramount since in their work, the users are necessarily out in the field delivering and there is no one else there to help. Shelving units should be sturdy enough for the size and weight of packages that will be stowed on them, yet not added any unnecessary weight to the vehicle for fuel efficiency.

In the event an item should slip behind a rear edge of a mounted shelving unit, it should not be necessary to entirely disassemble the unit to retrieve the item. Packages and items should be restrained from sliding off of the shelf when the vehicle is in motion, particularly when turning corners, accelerating or stopping.

Typical delivery vehicles have side walls made of plywood with one or more slotted, horizontally running channels, such as E Series Track, mounted at different heights thereon. The channels have spaced apart vertical slots. Various manufacturers, such as Kinedyne Corporation of Branchburg, N.J., make such channels and devices for connecting into the slots of the channels for mounting cross beams, such as the Series E Wood Beam Socket, within the box of the vehicle.

SUMMARY OF THE INVENTION

The present invention is capable of being et bodied in many aspects which would be readily apparent to those of skill in the art.

In a first aspect of the invention, a stowable shelving unit is provided for use in combination with a slotted, horizontally running channel, the channel having spaced vertical slots. The unit comprises a shelf, and three wall clip/brackets, the shelf being pivotally attached to the three clip/brackets at equi-spaced connection positions. Each clip/bracket comprises an engagement portion and a pair of parallel, extending arms. The engagement portion is connectible with one of the spaced vertical slots in the slotted, horizontally running channel. Each arm has a curved slot, and a pivot hole positioned above one end of the curved slot with the slot extending in an arc with the other end of the slot higher in elevation than the one end when the clip/bracket is mounted on the channel. A bolt pivotally attaches the shelf to the clip/bracket passing through the pivot holes of the pair of arms. A pin pivotally passes through the curved slots of the pair of arms and engages the shelf. One of the three clip/brackets has an additional vertical retention slot at the one end of the curved slot in each of the arms extending downwardly therefrom. When the engagement portions of the three brackets are connected to respective slots in the channel, the shelf is pivotable to a first, substantially horizontal position with the pins at the other end of the slots, and to a second, substantially vertical position with the pin of said one of the three brackets being in the vertical retention slots of the one bracket thereby holding the shelf in the second, substantially vertical position.

In a second aspect of the invention including the features of the first aspect, the shelf comprises a tray and three supports. The supports are fixed to an underside of the tray at the above equi-spaced connection positions. Each support at one end thereof has a pin slot and a bolt hole. The bolt passes through the pivot holes of the pair of arms and the bolt hole of the support. The pin slot extends longitudinally of the support and is positioned closer to the support one end with the pin passing through the pin slot.

In a third aspect of the invention including the features of the first and second aspects, the tray has a rolled edge along the perimeter thereof and corner trim piece protectors.

BRIEF DESCRIPTION OF THE DRAWINGS

The invention will be better understood and become apparent when consideration is given to the following detailed description thereof. Such description makes reference to the annexed drawings wherein:

FIG. 9 is a partial cross-sectional view of one side of the shelf; and

FIGS. 10A and 10B are respective side and front views of conventional slotted in which the present invention can be mounted.

DETAILED DESCRIPTION

Figure 1:
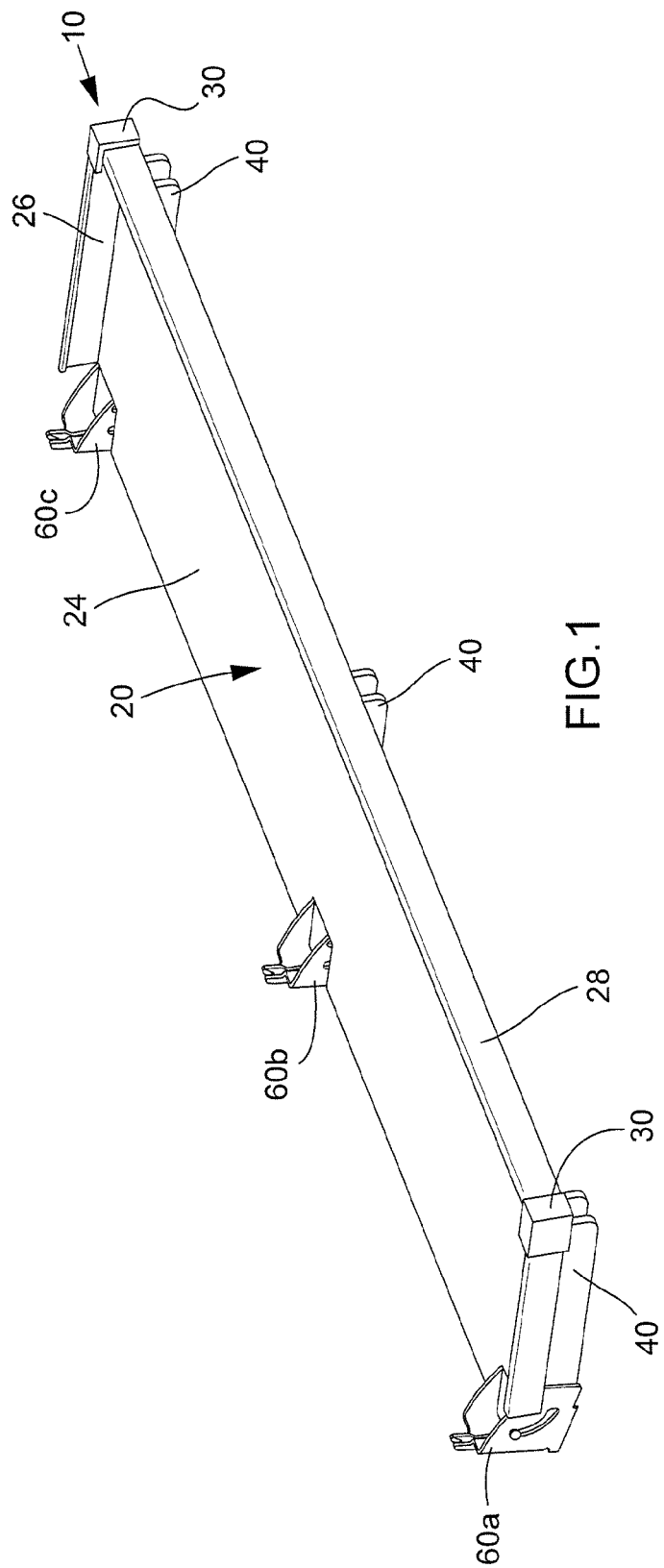
FIG. 1 is perspective view of a first embodiment of the invention in a first, substantially horizontal position.
Figure 2:
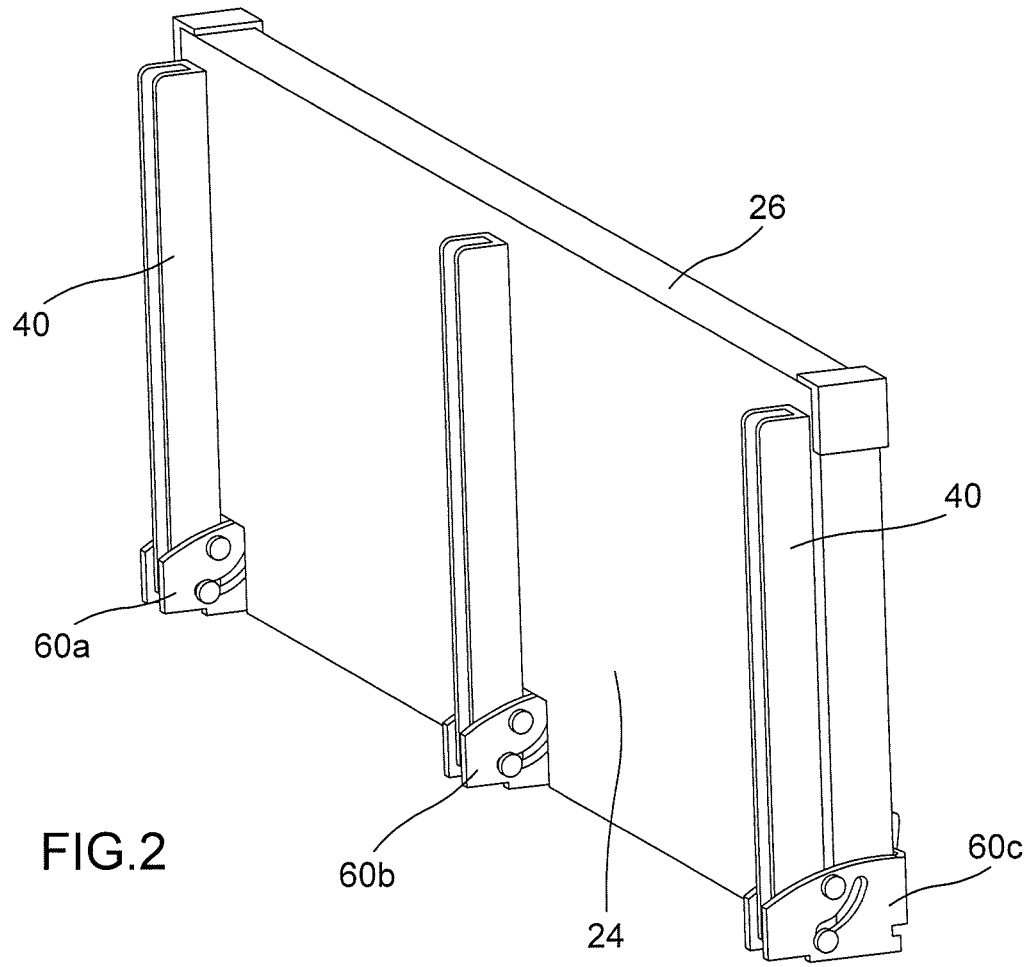
FIG. 2 is perspective view of the invention in a second, substantially vertical position.

The shelving unit 10 is stowable in that it is designed to be in a first, substantially horizontal position as shown in FIG. 1 and pivotable to a second, substantially vertical position as shown in FIG. 2. The shelving unit 10 can be used in combination with a slotted, horizontally running channel 12, such as the Series E Track, sold by Kinedyne Corporation, the channel having spaced vertical slots 14 and generally being installed on an interior wall of a vehicle at a desired height. (FIGS. 10A and 10B). The channel is mounted in any convenient manner of the walls of the vehicle.

Figure 3:
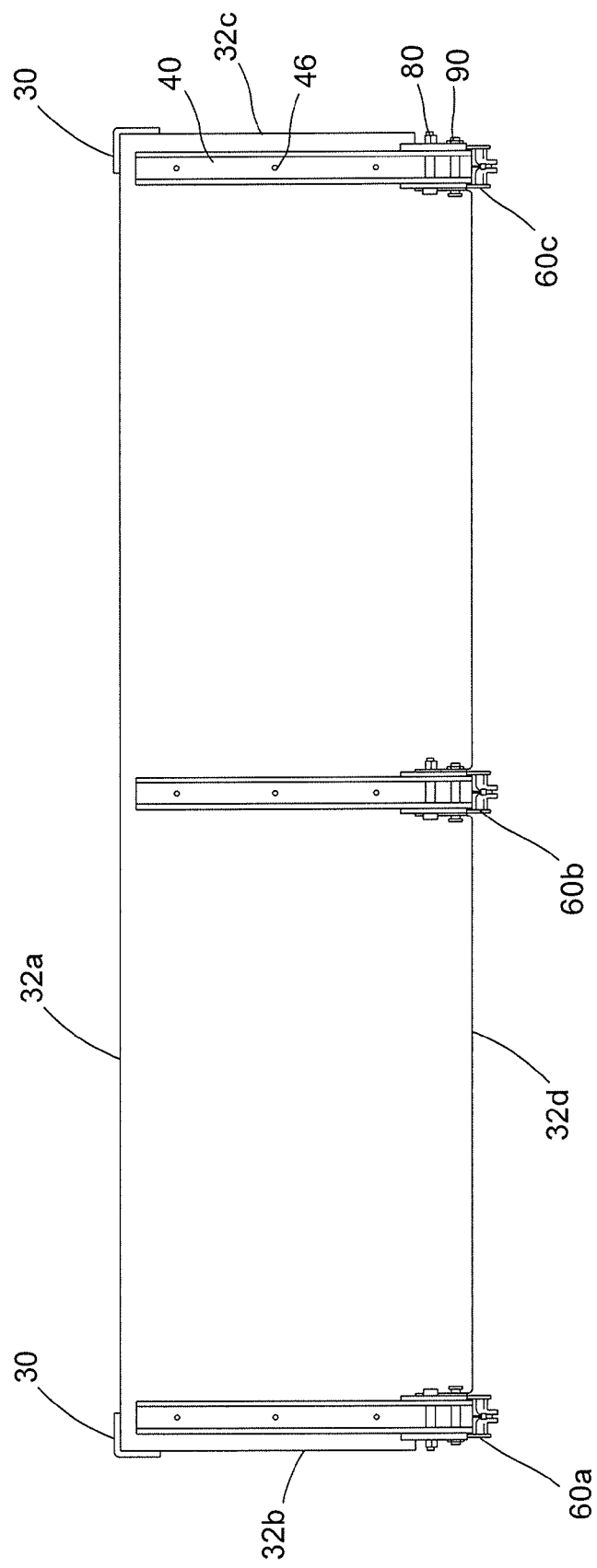
FIG. 3 is bottom view of the invention.
Figure 4:
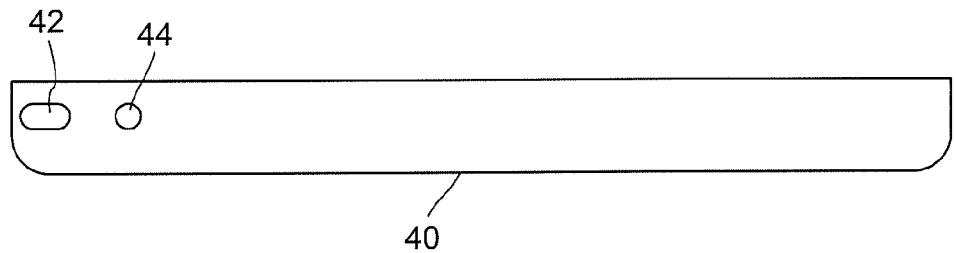
FIG. 4 is a side view of a support.
Figure 5:
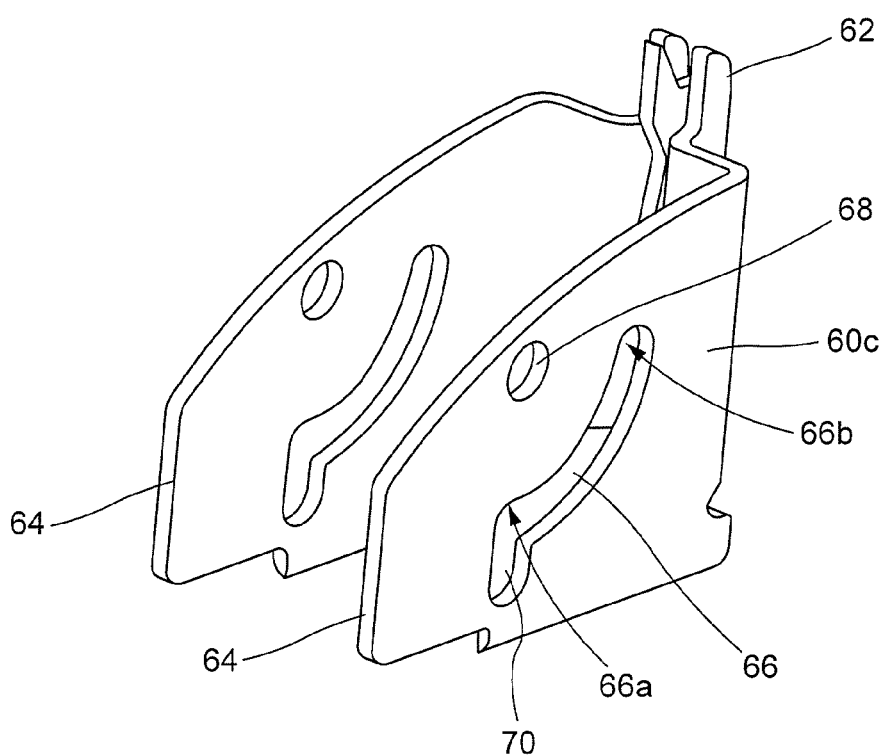
FIG. 5 is a perspective view of one clip/bracket.
Figure 6:
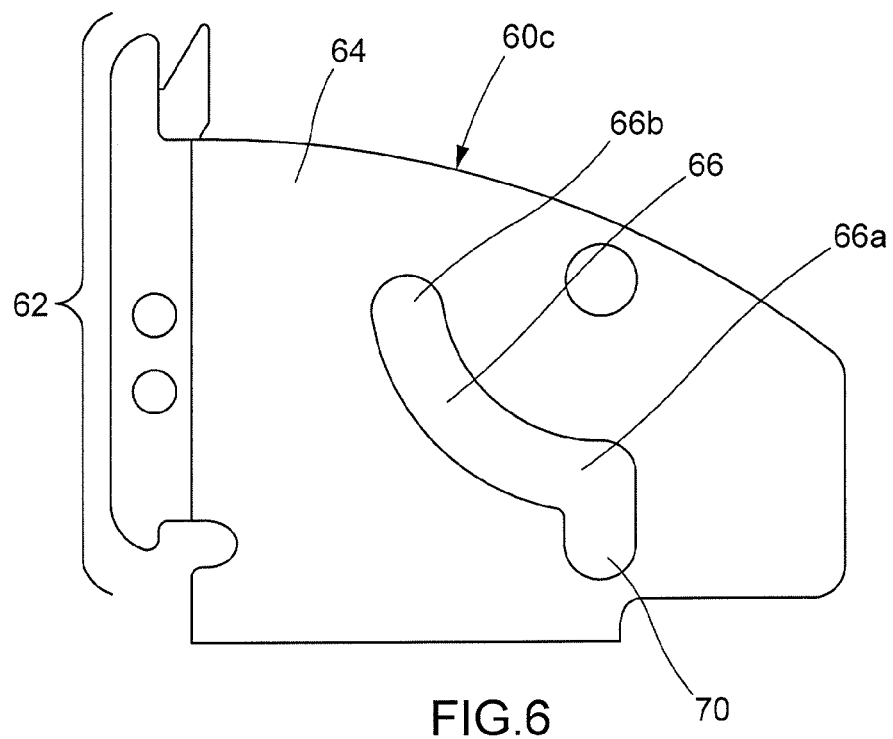
FIG. 6 is a side view of that one clip/bracket.
Figure 7:
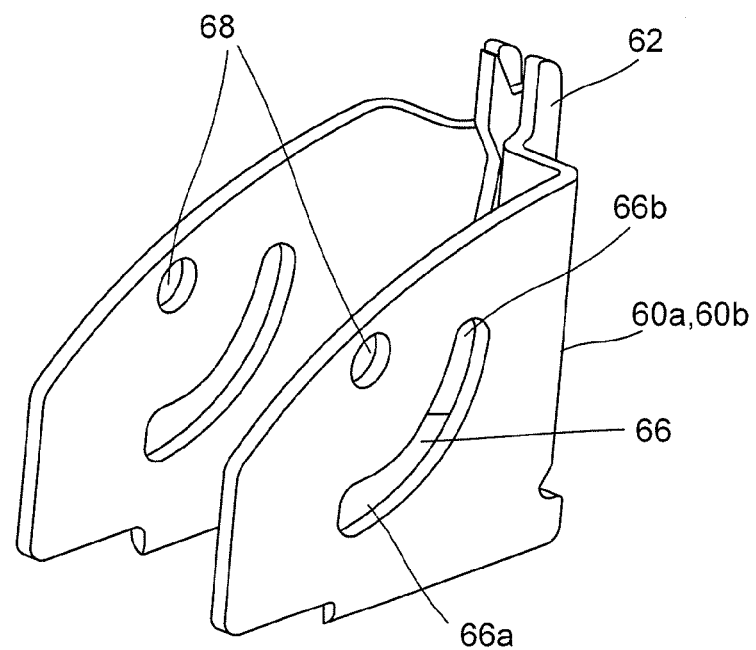
FIG. 7 is a perspective view of another clip/bracket.
Figure 8:
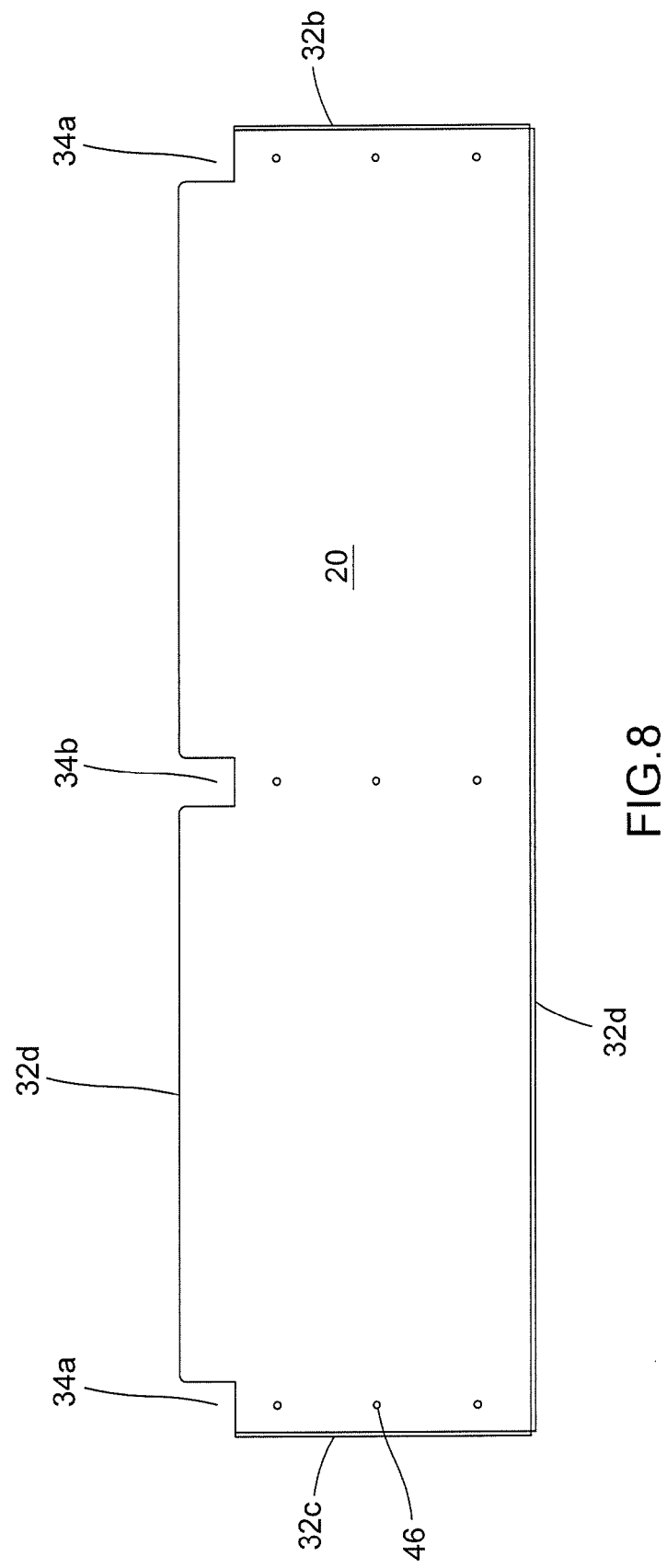
FIG. 8 is a top view of the shelf prior to mounting.

The shelving unit 10 includes a shelf 20 and three wall clip/brackets 60a, 60b, and 60c. The shelf includes a tray 24 and three supports 40. The supports 40 are fixed to an underside of the tray 24, such as by rivets 46, at equi-spaced connection positions along the tray 24. The tray 24 includes a base, upstanding walls 26 on three sides and corner trim piece protectors 30 (FIGS. 1, 2, and 3). The uppermost edges 28 of the upstanding walls 26 are rolled to provide a smooth rolled edge provided along a perimeter to enable the easy sliding of a parcel or item over the edge without any danger of damage to the parcel or item or to the user. (FIG. 9). Each shelf has a front side 32a, a left side 32b, a right side 32c and a back side 32d. The front side 32a, the left side 32b, and the right side 32c have the upstanding walls 26, while the back side 32d has two corner cutouts 34a and a center cutout 34b which are provided for the functions described below. The cutouts 34a, 34b are sized to clear the clip/brackets 60, described below, as the shelf 20 is pivoted from the first to the second positions or vice versa.

The three supports 40 each have at one end, a pin slot 42 and a bolt hole 44. The supports 40 are all fixed to the tray of the shelf, such as by rivets 46, and have their bolt holes 44 and their pin slots 42 adjacent the back side 32d of the tray 24. The pin slots 42 extend longitudinally of the support 40 and are positioned closer to the back side 32d of the tray 24 than the bolt holes 44 for a purpose described below.

The shelf 20 is pivotally attached to the three clip/brackets 60a, 60b, and 60c at equi-spaced connection positions. Each clip/bracket 60 includes an engagement portion 62 and a pair of parallel, extending arms 64. The engagement portion 62 is connectible with one of the spaced vertical slots in the slotted, horizontally running channel in a known manner. Each arm 64 has a curved slot 66 and a pivot hole 68 positioned above one end 66a of the curved slot 66. The slot 66 extends in an arc with the other end 66b of the slot higher in elevation than the one end 66a when the clip/bracket 60 is mounted on the channel.

A bolt 80 pivotally attaches the shelf 20 to the clip/bracket 60 passing through the pivot holes 68 of the pair of arms 64. FIGS. 1, 2, and 3. The bolt 80 passes through the bolt hole 44 of the respective support 40.

A pin 90 pivotally passes through the curved slots 66 of the pair of arms 64 and engaging the shelf 20 by passing through the pin slot 42 of the support. The pins 90 can be held in position by any standard, known method, such as by the use of cottar pins/clevis pins in holes drilled at the opposite ends of each pin.

One 60c of the three clip/brackets 60a, 60b, 60c has an additional vertical retention slot 70 at the one end 66a of the curved slot 66 in each of the arms 64 extending downwardly therefrom. The one clip/bracket 60c is the clip/bracket 60 positioned closest to the rear cargo door of the vehicle when the shelf unit 10 is mounted in a vehicle.

When the engagement portions 62 of the three clip/brackets 60 are connected to respective slots in the channel, the shelf 20 is pivotable to the first, substantially horizontal position. At this first position (FIG. 1), the pins 80 are at the other end 66b of the slots 66. As the shelf 20 is pivoted to the second, substantially vertical position, the supports rotate about the bolts with the clip/brackets being cleared through the cutouts and the pins sliding along the curved slots. Once the shelf 20 has reached the second, substantially vertical position, the pin 90 of the one clip/bracket 60c of the three brackets 60 drops along the pin slot 42 in the respective support 40 and into the vertical retention slot 70 in that one clip/bracket 60c thereby holding the shelf 20 in the second, substantially vertical position.

The shelving unit 10 can be pre-assembled in right-hand or left-hand units. That is, for ideal operations, the retention slot 70 is only provided on one 60c of the clip/brackets 60 and that particular clip/bracket 60c can be mounted at a position adjacent the rear roll-up cargo door of the vehicle. In this manner, a user standing at the rear door can simply stow or deploy the shelf.

The entire unit weight is the minimum possible with the required strength and sturdiness. This reserves weight for packages and other items for transport by the vehicle and improves fuel efficiency.

The shelving unit can be loaded with items easily through the rear cargo roll-up door of the vehicle with the shelving positioned at an ideal level above the wheel box top surface in the deployed position (such as 13 inches over the surface). The unit can be positioned 24.00 inches above the cargo floor.

The tray has a rolled bend around the perimeter of the shelf which can be 1.75 inches. This is selected with the standard or lack thereof size of packages or items to be placed on the shelf.

The system protects parcels from damage. The rolled bend perimeter enables the user to slide parcels or packages onto the shelf which ensures it stays on the shelf white the vehicle is turning, accelerating, or stopping. This feature dramatically reduces the risk of damaging parcels because they will stay on the shelf.

Spilled items in the vehicle can be retrieved with the use of known tools. However, the shelving unit would not need to be disassembled to retrieve any item in the unlikely event that it did spill. The unit includes the rolled bend around the perimeter to retain the items when the vehicle is executing turns, accelerating/decelerating, or stopping. The positioning of the unit above the cargo floor of the vehicle is placed to enable a female in the $5^{th}$ percentile to view the contents of the shelf and be readily able to reach the same with a standard picking tool.

The shelving unit's simple design does not allow slim items to become inaccessible. If a slim item falls out of the tray, the spacing between the e-channel and the shelf enables the item to drop through to the wheel box shelf. By simply stowing the shelf, the user is able to access the fallen slim item as needed The unit utilizes the existing vehicle wall channel that is included in the rear cargo area of a typical delivery vehicle and is retained in place by the three above described clip/brackets (shown in FIG. 1). Due to the existing infrastructure included, shelving operation is intuitive and is simply operated by lifting and moving the pin.

The shelving unit is designed to be free of sharp edges or pinch points accessible by the user or maintenance personnel. The system has a rolled edge along the perimeter of the shelf which eliminates a rough metal top edge. Each corner is protected with a plastic trim piece to avoid binding or snagging of parcels when loaded or unloaded from the unit or scratching the user. The unit minimizes pinch points by using hinge slots that are smaller than a finger to reduce the likelihood that they could be pinched when the shelves are moved back and forth from deployed to stowed positions.

The system shelf is easily folded up against the interior wall of the cargo area when not in use. To stow, the user simply lifts up on the shelf from the extended end extending (possibly 17.00 inches from the wall) and guides the shelf to the vertical position until the retention pin clicks into place in the vertical retention slot (FIG. 2). The integrated, sturdy retention pin holds the shelf in the vertical position. The system, when in the stowed position, (FIG. 2) can extend less than 5 inches, for example, from the wall. To redeploy, the user simply lifts up on the retention pin in the vertical retention slot (FIG. 1) within the hinge and moves the shelf to the deployed position. Since the retention slot is only provided on one of the clip/brackets and that particular clip/bracket can be mounted at a position adjacent the rear roll-up cargo door of the vehicle, it is simple for the user to stow and/or deploy the shelf of the shelving unit. There is no need to reach to or operate multiple pins or catches.

With use of standard engagement portions of the clip/bracket and the known usual slotted horizontally running channels, the unit is easy to install and requires no vehicle modifications, hole-drilling, or welding. The system can be installed in a very short time, such as less than 5 minutes through the use of the existing channel located in the rear cargo area on the wall of the vehicle.

The tray and supports can be made of ⅛ inch thick aluminum sheet per AA3003-H14 or equal for example, as this minimizes the weight of the unit while retaining sturdiness and durability. The clip/brackets can be made of zinc plated steel. The pin can be made of cold finished steel rod per SAE 1018 or equal. The bolts, washers, nuts, cottar pin, etc can be standard ANSI hardware and does not need to be specially made.

Fastener ends are not left exposed in any area where personnel may move in and about the vehicle in normal operations. Rivets are used to fix the tray to the supports and when installed extend 0.085 inches (2.2 mm) above shelf surface. Fasteners used in the hinge assembly include shoulder bolt and nylon lock nut and are not left exposed where personnel may move in an about, therefore reducing the risk of clothing or parcels or any other items snagging/binding during movement.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. A stowable shelving unit for use in combination with a slotted, horizontally running channel, the channel having spaced vertical slots, the unit comprising:
   a shelf comprising a tray and three supports, the supports being fixed to an underside of the tray at equi-spaced connection positions, each support at one end thereof having a pin slot and a bolt hole, the pin slot extending longitudinally of the support and being positioned closer to the support one end;
   three wall clip/brackets, the shelf being pivotally attached to the three clip/brackets at said equi-spaced connection positions;
   each clip/bracket comprising:
      an engagement portion and
      a pair of parallel, extending arms,
      the engagement portion being connectible with one of the spaced vertical slots in the slotted, horizontally running channel,
      each arm having a curved slot, and a pivot hole positioned above one end of the curved slot, the slot extending in an arc with the other end of the slot higher in elevation than the one end when the clip/bracket is mounted on the channel;
   a bolt pivotally attaching the shelf passing through the pivot holes of the pair of arms and the bolt holes of the shelf; and
   a pin pivotally passing through the curved slots of the pair of arms and the pin slots of the shelf and engaging the shelf;
      wherein only one of said three clip/brackets has an additional vertical retention slot at the one end of the curved slot in each of the arms extending downwardly therefrom,
      wherein the pin is configured to move freely in a vertical direction within the retention slot and the pin slot;
      whereby when the engagement portions of the three brackets are connected to respective slots in the channel, the shelf is pivotable between a first, substantially horizontal position with the pins at the other end of the slots, and a second, substantially vertical position with the pin of said only one of the three brackets being in the vertical retention slots of the one bracket thereby holding the shelf in the second, substantially vertical position.

2. The shelving unit according to claim 1, wherein the tray has a rolled edge along a perimeter thereof.

3. The shelving unit according to claim 1, wherein the tray has corner trim piece protectors.

4. The shelving unit according to claim 1, wherein the tray has a rolled edge along a perimeter thereof and corner trim piece protectors.

* * * * *

UNITED STATES PATENT AND TRADEMARK OFFICE
CERTIFICATE OF CORRECTION

| | | |
|---|---|---|
| PATENT NO. | : 9,260,046 B2 | Page 1 of 1 |
| APPLICATION NO. | : 14/141152 | |
| DATED | : February 16, 2016 | |
| INVENTOR(S) | : Christopher Mowry et al. | |

It is certified that error appears in the above-identified patent and that said Letters Patent is hereby corrected as shown below:

Title Page

(72) Inventors: Charles E. Dillion, II, Somerset, PA (US);

should read:

(72) Inventors: Charles E. Dillon, II, Somerset, PA (US);

Signed and Sealed this
Twelfth Day of July, 2016

Michelle K. Lee
*Director of the United States Patent and Trademark Office*